(12) United States Patent
Hughes et al.

(10) Patent No.: US 8,326,277 B2
(45) Date of Patent: Dec. 4, 2012

(54) CALL MANAGEMENT OVER REDUCED BANDWIDTH

(75) Inventors: Michael Hughes, San Francisco, CA (US); Abdelkareem Siddiq, Concord, CA (US)

(73) Assignee: Ring2 Communications Limited, London (GB)

( * ) Notice: Subject to any disclaimer, the term of this patent is extended or adjusted under 35 U.S.C. 154(b) by 475 days.

(21) Appl. No.: 11/798,526

(22) Filed: May 15, 2007

(65) Prior Publication Data

US 2007/0287466 A1 Dec. 13, 2007

Related U.S. Application Data

(60) Provisional application No. 60/800,431, filed on May 16, 2006.

(51) Int. Cl.
*H04M 3/42* (2006.01)
(52) U.S. Cl. ........ 455/416; 455/450; 709/205; 709/225; 709/207; 709/227; 709/203; 370/352; 370/401; 370/466; 370/261; 370/260; 370/390; 370/356; 370/389; 370/262; 370/312; 370/395.52; 379/88.17; 379/205.01
(58) Field of Classification Search .................. 455/416, 455/450; 709/205, 225, 207, 227, 203; 370/352, 370/401, 466, 261, 260, 390, 356, 389, 262, 370/312, 395.52; 379/88.17, 205.01
See application file for complete search history.

(56) References Cited

U.S. PATENT DOCUMENTS

| | | | | |
|---|---|---|---|---|
| 7,145,900 | B2 * | 12/2006 | Nix et al. ...................... | 370/352 |
| 7,154,864 | B2 * | 12/2006 | Costa-Requena et al. .... | 370/261 |
| 2003/0145054 | A1 * | 7/2003 | Van Dyke ..................... | 709/205 |
| 2005/0210104 | A1 * | 9/2005 | Torvinen ....................... | 709/205 |
| 2006/0031368 | A1 * | 2/2006 | deCone .......................... | 709/207 |

FOREIGN PATENT DOCUMENTS

WO  WO 2004/008178  1/2004

OTHER PUBLICATIONS

Niemi Nokia Research Center A, "Session Initiation Protocol (SIP) Event Notification Extension for Notification Throttling", IETF Standard-Working-Draft, Chapter No. 4, Mar. 6, 2006.
Khartabil Telio E Leppanen M Lonnfors J Costa-Requena Nokia H, "Functional Description of Event Notification Filtering", IETF Standard-Working-Draft, Chapter No. 5, Mar. 15, 2005.

* cited by examiner

*Primary Examiner* — Charles Appiah
*Assistant Examiner* — Alexander Yi
(74) *Attorney, Agent, or Firm* — Pearl Cohen Zedek Latzer, LLP

(57) ABSTRACT

A status proxy server having a full bandwidth connection with a media server and wireless connection with a mobile end user device, receives SIP or similar protocol structured data; maintains a status indicator representative of the received structured data; and communicating at time intervals an update of the status indicator to the mobile end user device.

7 Claims, 2 Drawing Sheets

CALL MANAGEMENT OVER REDUCED BANDWIDTH

CROSS REFERENCE TO RELATED APPLICATION

This application claims the benefit of U.S. Patent Application No. 60/800,431, filed May 16, 2006, under 35 U.S.C. §119(e).

BACKGROUND OF THE INVENTION

This invention relates to telecommunication and—in an important example—to the provision of enhanced telecommunication services such as conference calls.

Telephone systems and services are ubiquitous and are used for both residential and business purposes. The services and features provided by telephony systems have developed from simple person-to-person calls to conference calls where many parties are connected together at a time. There exist of course a wide variety of telephony devices for end users, including fixed line handsets, mobile/cellular handsets, personal digital assistants or other mobile computing devices that are mobile/cellular enabled and Internet Protocol (IP) telephones.

A variety of methods and systems have been proposed for managing telephone call set-up and in-call functions. Some of these are specific to network types (for example Public Switched Telephone Network (PSTN), mobile/cellular or Voice over IP (VoIP); others apply to a range of networks. Business users typically require a range of call set-up and in-call functions services, which are typically provided by a Private Automatic Branch Exchange (PABX). Service providers may offer enhanced services such as automated dial-in or operator-assisted conference calls. It has further been proposed (see for example WO 2005/101857) to provide enhanced telecommunication services to end users, which are media transport network independent. A service that allows users to remotely view and manage the participants of a call, has significant appeal in terms of security, visibility and control.

A significant percentage of all of the people who participate in conference calls, for example, have wireless devices. Such devices may have restricted bandwidth connections or restricted processing capacity and it has hitherto proved difficult to provide—effectively and efficiently—a system that allows such users to remotely view and manage the participants of a call.

SUMMARY OF THE INVENTION

According to one aspect of the present invention, there is provided a method of communicating between a mobile end user device and a media server, which media server forms part of a communication network providing for calls between end users, the media server being configured to communicate with some end users according to at least one call management structured data set, the method comprising the steps of: establishing a status proxy server having a full bandwidth connection with the media server and a reduced bandwidth connection with the mobile end user device; receiving structured data at the status proxy server from the media server according to the call management structured data set; maintaining a status indicator at the status proxy server, which status indicator is representative of the received structured data; and communicating at time intervals an update of the status indicator to the mobile end user device.

Preferably, the time intervals between the communication of updates of the status indicator to the mobile end user device are in aggregate substantially greater than the time intervals between receipt of structured data at the status proxy server according to the call management structured data set.

Advantageously, the communication of updates of the status indicator to the mobile end user device are asynchronous with receipt of structured data from the media server at the status proxy server.

Suitably, the bandwidth of the communication between the media server and the status proxy server is at least four times and preferably at least ten times greater than the bandwidth of the communication between the status proxy server and the mobile end user device.

In a preferred embodiment, the step of communicating updates of the status indicator comprises the steps of: determining the time interval since the last status update communicated to the mobile end user device; determining an structured data type represented in the status indicator; and electing in accordance with those determinations whether or not to communicate an update to the mobile end user device.

Usually, the reduced bandwidth connection with the mobile end user device is a wireless connection.

In the currently preferred embodiment, the call management structured data set is defined by the SIP protocol as defined by the Internet Engineering Task Force (IETF).

In one example, a status proxy is placed between multiple servers and/or network devices and a client, whereby the status proxy aggregates and processes numerous data interactions with the servers, before sending only a compressed 'snapshot' summary output to the device, such summary being tailored to provide only information relevant to the end user. Therefore the bandwidth required for communication with the device, which may be a mobile device such as a BlackBerry ®, is significantly reduced, by perhaps four, ten or more times, allowing for more dependable real-time communication of events. In addition, the demand on memory and processor power in the device is reduced as it has to process fewer data and limited processes itself as these are handled at the status proxy level. Furthermore, the status proxy allows the client to be protocol independent with the status proxy translating the messages from the servers and/or network devices into a standard, simplified 'light' protocol for updating the device.

Currently, to have real-time updates between a device and an media server using the Session Initiation Protocol (SIP) or similar, the device needs to process numerous intermediary instructions and handshakes with the server according to the standard which involve relatively large data packages and numerous intermediary stages as compared to the minimal resulting changes to the actual call state. An example is a conference call being controlled through a BlackBerry, with call instructions sent from the device and real-time status being displayed on it following information received from the server. Where many participants may be joining the call at the same time and separate call instructions may be simultaneously be acted upon the resulting flood of messages generated by the standard protocol would overwhelm the memory and processing power of the current generation of data-connected devices as well as overwhelm the wireless data channel.

Without the present invention, the BlackBerry's performance is affected due to the number of SIP interactions required with the server, which will notify the device of each stage of a call: instruction received; call being initiated; line seized; line ringing; line answered; etc. In addition, the device would need to support a full SIP stack for this purpose. As a result, twin demands are made on the processing power and memory of the device and the bandwidth of its data connection.

With the present invention, the BlackBerry sends an initial instruction to the server, which then carries out the numerous SIP handshakes with the server, before sending the few relevant data to the device: line connecting; line answered. In addition, the requirement to use a protocol such as SIP only exists between the server and status proxy; the status proxy and device can communicate in a manner that facilitates low bandwidth usage. The communication only needs to carry the specific information to convey leg status and not the additional information normally found in VoIP protocol packets.

Embodiments of the present invention will enable enhanced call management functionality to be provided in certain cases where restrictions on bandwidth or processing power would otherwise have made it impossible for such functionality to be provided. In other cases, embodiments of the present invention will enable enhanced call management functionality to be provided at lower power or with increasing levels of notifications.

BRIEF DESCRIPTION OF THE DRAWINGS

The present invention will now be described by way of example with reference to the accompanying drawings, in which.

DETAILED DESCRIPTION OF PREFERRED EMBODIMENTS OF THE INVENTION

In arrangements such as that disclosed in WO 2005/101857 (the contents of which are incorporated herein by reference) call control is effected between a device, such as a computer, entering into a communication with a voice over internet protocol (VoIP) server, such as a conference bridge and relevant PSTN gateways. Such communication is over a data connection and uses a protocol such as H323 or SIP. However, this requires significant computing capacity on the device and bandwidth for the communications required by the protocol (typically, an event in a VoIP protocol generates an information package of a few kilobytes of information). Internet connected wireless devices can theoretically be used to manage a VoIP session with a VoIP server, however, memory, processor and bandwidth limitations make running a VoIP codec directly on a wireless device unworkable for real time call management purposes in many practical applications.

Figure 1:
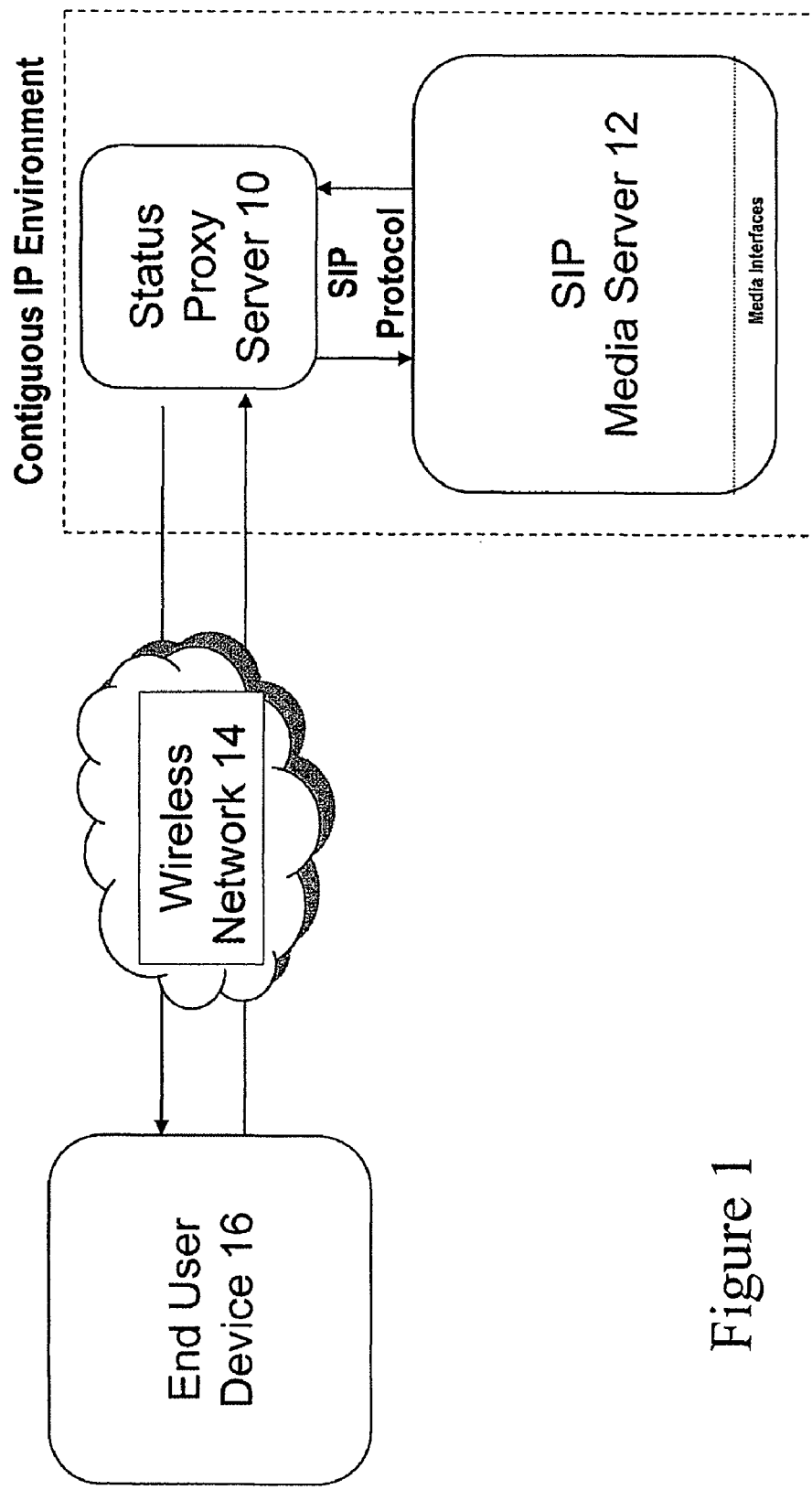
FIG. 1 is a diagrammatic overview of apparatus according to an embodiment of the invention.

As illustrated in FIG. 1, the present invention can be implemented by placing a status proxy server (10) in between the VoIP or media server (12) and the wireless network 14 which communicates with each end user device (16). The status proxy server (10) carries out the relevant protocol communications with the VoIP server (12). The status proxy can be situated in the same IP environment as the VoIP server and be provisioned with sufficient capacity to effectively manage the real time VoIP sessions for each call. The term "structured data" is used herein to mean the information, instructions, handshake and other data provided under the SIP or other call management protocol. The status proxy server can then relay the relevant summary 'snapshot' of call state information to the relevant wireless device in a very small packet of information (usually less than 256 bytes) that neither burdens the wireless device nor has a significant impact on its bandwidth usage. These small packets may be contrasted with a typical SIP packet size of 3 Kbytes. Recognising that there will be considerably greater traffic of this large packet size between the status server and the media server, with attendant handshaking, it will be seen that the bandwidth utilised between the media server and the status proxy server can be four or more or ten or more times greater than the bandwidth required between the status server and the end user device.

Therefore, the numerous information exchanges necessary within a universal session management protocol can take place in a fast environment, between the VoIP server and status proxy. All the device needs to do is notify the status proxy of its initial instruction (for example, "call this number into the conference bridge"). The status proxy then translates that instruction into the relevant VoIP protocol such as SIP and carries out the dialogue with the VoIP server. Once there is a relevant event (for example, "Ringing you now"), the status proxy updates the summary 'snapshot' and checks when the last snapshot update was sent to the device. If the last snapshot update was sent longer than a definable threshold amount of time ago, then the snapshot is sent to the device. If the threshold has not been reached, then no update is sent until the threshold period has passed. When the status changes again (for example, they answer the call), the threshold timer is again checked and if the threshold period has elapsed a simple information update snapshot is sent to the device (for example, "call answered").

In the above example, the device has sent one instruction and received two pieces of information in return without the need for the heavy intermediate handshaking and authentication required for protocols designed for high bandwidth environments with more powerful processors. In contrast, the status proxy and server will have exchanged many more instructions and information statements. Over the duration of a conference call, with the varying status of parties on the call, this represents a significant reduction in capacity and bandwidth required from the device.

Figure 2:
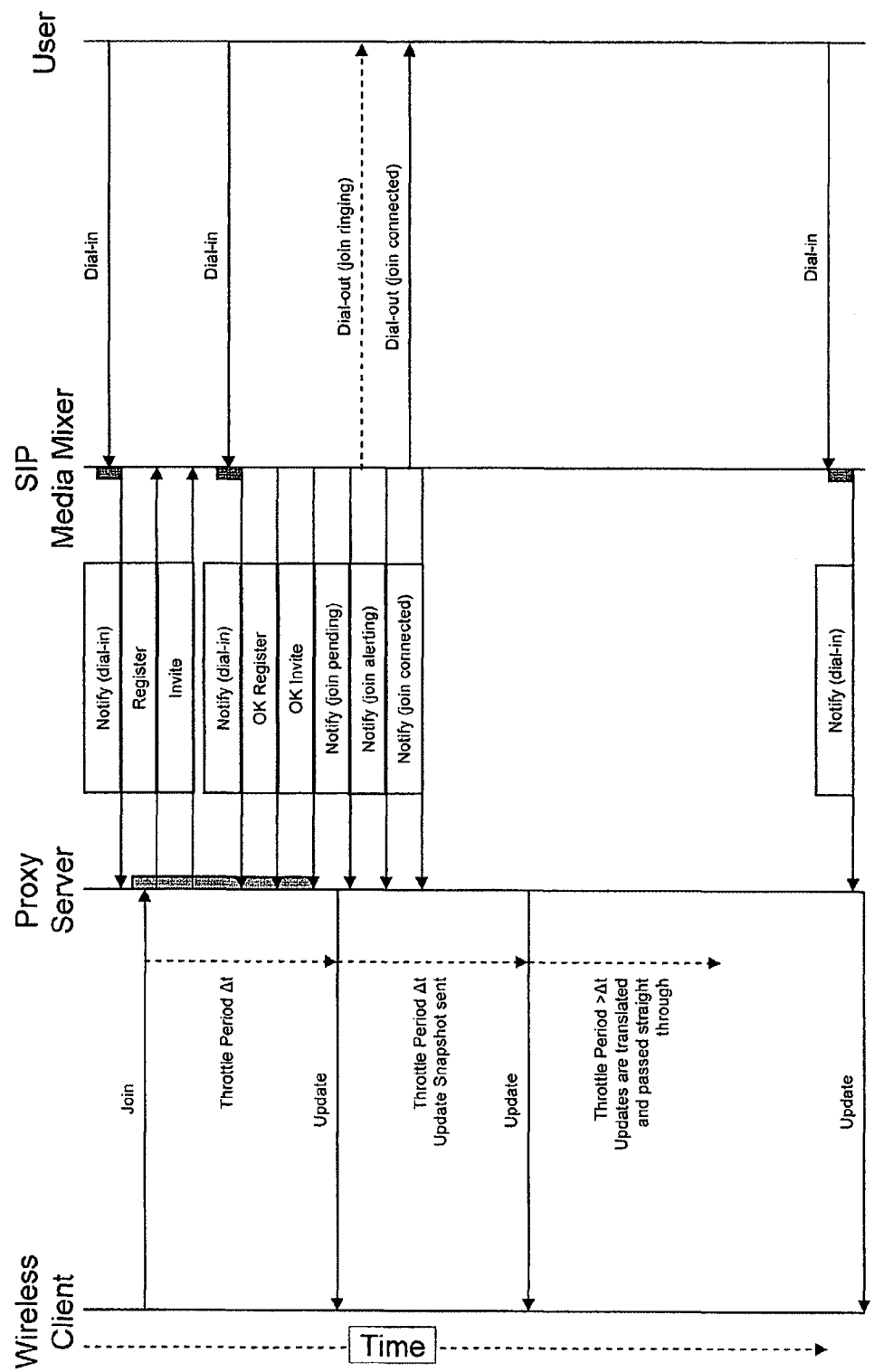
FIG. 2 is an associated exemplary call flow chart

For more detail, reference is directed to FIG. 2, which is a call flow diagram. The detail of this call flow diagram is largely self explanatory and requires no further discussion here.

Specific attention is drawn to the throttle period $\Delta t$. In one arrangement, a throttle function is generated which has as a parameter the time of the last update and which returns a Boolean value indicating if an update should be sent. A further parameter of the throttle function will usually be an event type. The various data within the structured data set of SIP or other protocol will be assigned different event types depending upon time criticality. Generally, the throttle function will provide for an update after a time interval that is shorter for more critical event types. The throttle function will usually also include a speed of connection parameter.

Generally, the lower the speed of connection or the more unreliable the connection, the longer will be the time interval between successive updates. The throttle function may further include a payload size parameter. Generally, the greater the payload size, the longer will be the time interval between successive updates.

It will be understood by the skilled man that the determination of such a throttle function is only one example of a technique for determining the time interval since the last status update communicated to the mobile end user device; determining an instruction type represented in the status indicator; and electing in accordance with those determinations whether or not to communicate an update to the mobile end user device.

The above-described embodiment of the invention relates specifically to initiation and control of a telephone call. It has particular utility where conference call functionality is required and especially where the remote user wishes to view and manage the participants of a call. It can of course be used with protocols other than SIP and can be used to provide other call set up or in call functionality. It will be understood that the participants on the call can be on the PSTN, a VoIP leg or indeed any other transport mechanism. The underlying method of transport is irrelevant to, and not a defining feature of, the invention. Other embodiments can include more than one VoIP server, indeed any number of servers and network elements (faxes, email notifications, etc) that are talking to the status proxy; the status proxy effectively summarises the events and sends a simple, asynchronous snapshot update to the client, without the need for the numerous, memory- and bandwidth-intensive handshaking that normally occurs with protocols, particularly more general protocols.

The invention claimed is:

1. A method of communicating between a mobile end user device and a media server, which media server forms part of a communication network providing for calls between end users, the media server being configured to communicate with some end users according to at least one call management structured data set defined by SIP (Session Initiation Protocol) or other call management protocol, the method comprising the steps of: establishing a status proxy server having a full bandwidth connection with the media server and a reduced bandwidth wireless connection with the mobile end user device; receiving structured data comprising information, instructions, handshake, and other data provided under the SIP or other call management protocol at the status proxy server from the media server according to the call management structured data set; maintaining a call status indicator at the status proxy server, which call status indicator is representative of the received structured data; and communicating at time intervals an update of the call status indicator to the mobile end user device which is asynchronous with the receipt of structured data at the proxy server and which summarises the structured data received at the proxy server, wherein the step of communicating updates of the call status indicator comprises the steps of: determining a throttle function having parameters of at least two of: the time interval since the last status update communicated to the mobile end user device; the time criticality of the structured data type; a speed of connection parameter; and a payload size; and electing in accordance with those determinations whether or not to communicate an update to the mobile end user device.

2. A method according to claim 1, wherein the mobile end user device is configured to manage conference calls involving the mobile end user device and at least two other end user devices in communication with the media server.

3. A method according to claim 2, wherein the call status indicator comprises an indication of the status of each call leg in a conference call.

4. Data processing apparatus adapted and configured to provide a status proxy server for use in a communication network providing for calls between end users, the communication network including at least one mobile end user device and a media server configured to communicate with some end users according to at least one call management structured data set defined by SIP (Session Initiation Protocol) or other call management protocol, the status proxy server having a full bandwidth connection with the media server and a reduced bandwidth wireless connection with the mobile end user device, the bandwidth of the communication between the media server and the status proxy server being at least four times greater than the bandwidth of the wireless communication between the status proxy server and the mobile end user device, the status proxy server serving to receive structured data comprising information, instructions, handshake, and other data provided under the SIP or other call management protocol from the media server according to the call management structured data set; maintain a call status indicator, which call status indicator is representative of the received structured data; and communicate at time intervals an update of the call status indicator to the mobile end user device which is asynchronous with the receipt of structured data at the proxy server and which summarises the structured data received at the proxy server, wherein the step of communicating updates of the status indicator comprises the steps of determining a throttle function having parameters of at least two of: the time interval since the last status update communicated to the mobile end user device; the time criticality of the structured data type; a speed of connection parameter; and a payload size; and electing in accordance with those determinations whether or not to communicate an update to the mobile end user device.

5. A method of communicating between a mobile end user device and a media server, which media server forms part of a communication network providing for calls between end users, the media server being configured to communicate with some end users according to at least one call management structured data set, the structured data set comprising the information, instructions, handshake and other data provided under SIP (Session Initiation Protocol) or other a call management protocol, the method comprising the steps of: establishing a status proxy server having a full bandwidth connection with the media server and a reduced bandwidth wireless connection with the mobile end user device, the bandwidth of the communication between the media server and the status proxy server being at least four times greater than the bandwidth of the wireless communication between the status proxy server and the mobile end user device; receiving structured data at the status proxy server from the media server according to the call management structured data set; maintaining a status indicator at the status proxy server, which status indicator is representative of the information, instructions, handshake and other data of the received structured data; and communicating at time intervals an update of the status indicator to the mobile end user device which is asynchronous with the receipt of structured data at the proxy server and which summarises the structured data received at the proxy server, wherein the step of communicating updates of the status indicator comprises the steps of: determining a throttle function having parameters of: the time interval since the last status update communicated to the mobile end user device; and the time criticality of the structured data type represented in the status indicator; and electing in accordance with those determinations whether or not to communicate an update to the mobile end user device.

6. The method according to claim 5, wherein said throttle function has a speed of connection parameter.

7. The method according to claim 5, wherein said throttle function has a payload size parameter.

* * * * *